O. F. FULLER.
Gate.
No. 216,388.        Patented June 10, 1879.
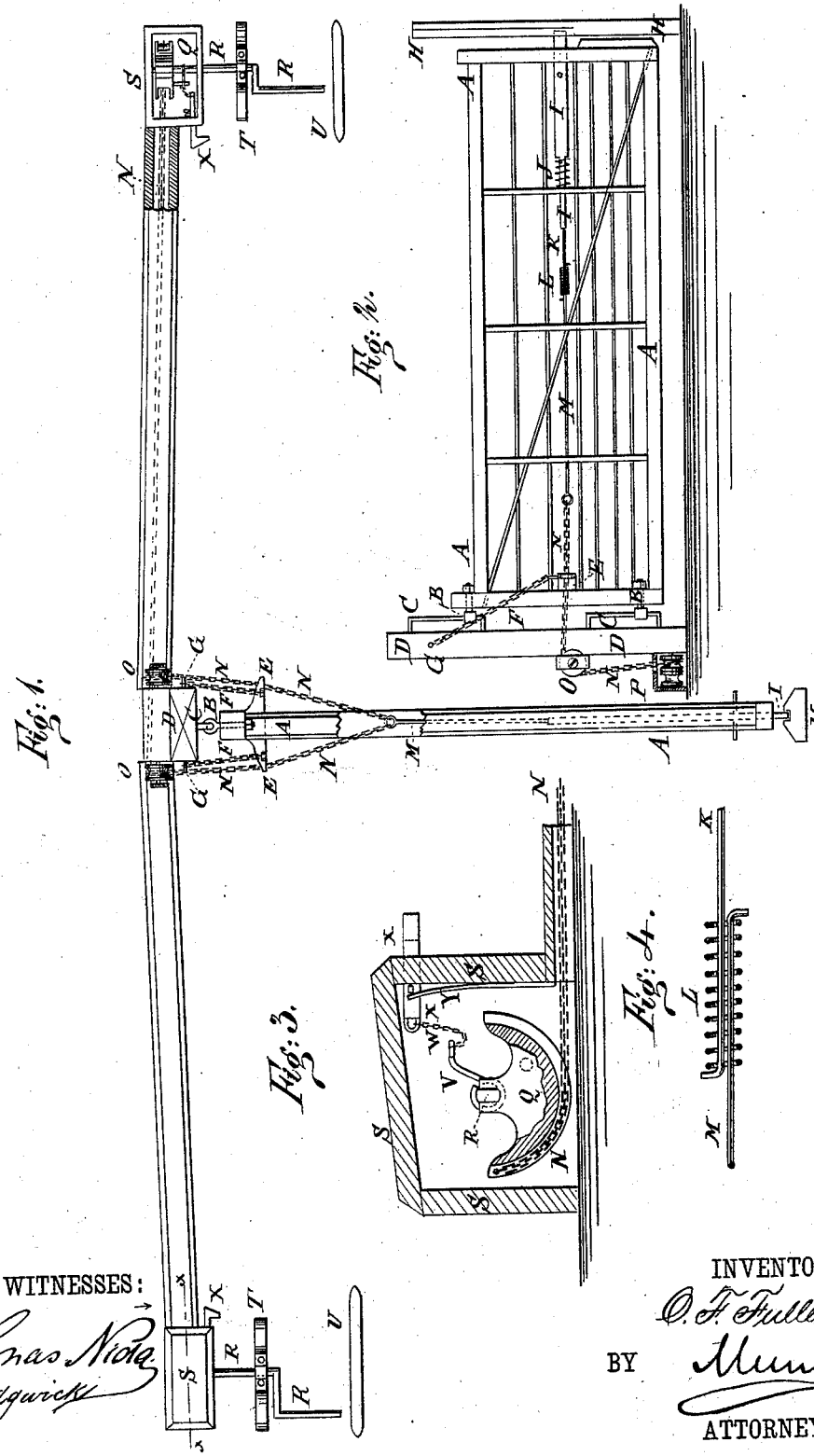
WITNESSES:
INVENTOR:
O. F. Fuller
BY
ATTORNEYS.

UNITED STATES PATENT OFFICE.

ORLANDO F. FULLER, OF LAMONT, MICHIGAN.

IMPROVEMENT IN GATES.

Specification forming part of Letters Patent No. 216,388, dated June 10, 1879; application filed April 4, 1879.

*To all whom it may concern:*

Be it known that I, ORLANDO F. FULLER, of Lamont, in the county of Ottawa and State of Michigan, have invented a new and useful Improvement in Gates, of which the following is a specification.

Figure 1 is a top view of my improved gate, parts being broken away to show the construction. Fig. 2 is a side view of the same. Fig. 3 is a detail view of the eccentric and spring-catch, the casing being shown in section through the line $xx$, Fig. 1. Fig. 4 is a detail section of the spiral spring.

Similar letters of reference indicate corresponding parts.

The object of this invention is to improve the construction of the gate for which Letters Patent No. 189,620 were issued to me April 17, 1877, so as to make it more convenient and reliable in use.

The invention consists in the combination of the rods, the chains, the cross-bar, the guide-pulleys, the eccentrics, and the cranks with the latch, the gate, and its post; in the combination of the coiled spring with the rods, the chains, the cross-bar, the guide-pulleys, the eccentrics, and the cranks, and with the latch, the gate, and its post; and in the combination of the arms, the chains, and the springs with the eccentrics, the cranks, and the catches.

A represents the gate, which may be made of any desired style or size.

To the rear end bar of the gate A are attached two eyebolts, B, the eyes of which receive and turn and slide upon the long staples C, attached to the rear post, D.

To the middle part of the rear end bar of the gate A is attached a cross-bar, E, to the ends of which are attached the lower ends of two chains, F. The upper parts of the chains F are hooked upon hooks G, attached to the opposite sides of the rear post, D, so that by adjusting the length of the said chains the gate A may be adjusted to work at any desired distance from the ground. The chains F also raise the gate a little as it is swung open, so that its weight may have an additional leverage in swinging it shut.

H is the forward post, which has the forward edges of its upper part beveled, and a longitudinal groove formed in its forward side, so that it may serve as a long catch to fasten the gate shut at whatever height it may be adjusted.

I is the latch, which slides in holes in the forward cross-bars of the gate A, and has its rear part rounded off to receive the spiral spring J, by which it is held out.

To the rear end of the latch I is attached the forward end of the short rod K, which is passed through the spiral spring L, and has its rear end bent to one side to keep it from being drawn out of the said spring L.

M is a rod, the forward end of which is passed through the spiral spring L, and is bent to one side to prevent it from being drawn out of the said spring L.

By this construction the spiral spring L serves as a cushion to prevent the parts of the gate from being injured by the sudden shock, should great force be used in opening it.

To the rear end of the rod M are attached the forward ends of two chains, N, which pass back upon the opposite sides of the gate A, through guide-holes in the ends of the cross-bar E, over pulleys O, pivoted to the post D, and around pulleys P, pivoted to the lower part of the post D, or to other suitable supports at the lower part of the said post.

From the pulleys P the chains N or rods attached to the said chains pass outward parallel with the roadway, and their outer ends are attached to the eccentrics Q, which are attached to the shafts of the cranks R, pivoted to boxes or casings S set in the ground. The cranks R project into the roadway into such a position that they may be struck by the wheels of vehicles passing through the gateway. The cranks R are strengthened against the blows of the vehicle-wheels by bearings T, attached to supports set in the ground.

U are guides set in the ground at the ends of the cranks R, to serve as guides in directing the vehicle-wheels against or away from the said cranks.

To the eccentrics Q, or to the shafts of the cranks R, are attached arms V, to the outer ends of which are attached the ends of the short chains W. The other ends of the chains W are attached to the inner ends of the catches X, the outer ends of which project and are beveled, so that when the gate is swung open its forward end may push back and pass the said catches, and thus be fastened open.

The catches X are held out by springs Y, connected with their inner ends and attached to the casings S.

With this construction when a vehicle approaches the gate in either direction the driver so guides his team that the wheel of the vehicle may strike the crank R and force it down to the ground. This movement turns the eccentric Q and draws upon the chain N, which unlatches the gate and then swings it open. After passing through the gateway the driver guides his team so that the wheel of the vehicle may strike the other crank R and force it to the ground from the gate. This turns the eccentric Q and draws back the catch X, allowing the gate to swing shut by its own weight.

I am aware that a gate has been operated by the action of the wheels of a vehicle in passing over cranks connected with eccentric pulleys which are themselves connected with the gate; but I desire to disclaim everything relating to this feature except my particular combination of parts.

Having thus described my invention, I claim as new and desire to secure by Letters Patent—

1. The combination of the rods K M, the chains N, the cross-bar E, the guide-pulleys O P, the eccentrics Q, and the cranks R with the latch I, the gate A, and the post D, substantially as herein shown and described.

2. The combination of the coiled spring L with the rods K M, the chains N, the cross-bar E, the guide-pulleys O P, the eccentric Q, and the cranks R, and with the latch I, the gate A, and the post D, substantially as herein shown and described.

3. The combination of the arms V, the chains W, and the springs Y with the eccentrics Q, the cranks R, and the catches X, substantially as herein shown and described.

ORLANDO FORKLIN FULLER.

Witnesses:
JOHN RICE,
L. C. REED.